United States Patent [19]
Onandia

[11] Patent Number: 5,270,512
[45] Date of Patent: Dec. 14, 1993

[54] ELECTRO-EROSION MACHINING TANK WITH A SIDE WALL DOOR

[75] Inventor: Carmelo Onandia, Durango, Spain

[73] Assignee: Ona Electro-Erosion, S.A., Spain

[21] Appl. No.: 891,219

[22] Filed: May 29, 1992

[51] Int. Cl.$^5$ .................. B23H 11/00; B23H 7/36
[52] U.S. Cl. ........................ 219/69.11; 204/129.1
[58] Field of Search ............ 219/69.11, 69.14, 69.17; 204/129.1

[56] References Cited

U.S. PATENT DOCUMENTS 4,712,288  12/1987  Lodetti et al. .................... 219/69.11

FOREIGN PATENT DOCUMENTS

| 3511393 | 10/1986 | Fed. Rep. of Germany ... 219/69.11 |
| 63-278718 | 11/1988 | Japan ................ 204/129.1 |
| 2-124224 | 5/1990 | Japan ................ 219/69.17 |
| 3-287311 | 12/1991 | Japan ................ 219/69.11 |
| 3-287312 | 12/1991 | Japan ................ 219/69.11 |
| 667409 | 10/1988 | Switzerland ........ 204/129.1 |
| 543317 | 9/1941 | United Kingdom . |
| 584387 | 1/1947 | United Kingdom . |
| 1194652 | 6/1970 | United Kingdom . |
| 1408668 | 10/1975 | United Kingdom . |
| 2170136 | 7/1986 | United Kingdom ....... 219/69.11 |

Primary Examiner—Geoffrey S. Evans
Attorney, Agent, or Firm—Lucas & Just

[57] ABSTRACT

The side wall door in the tank uses a system such as a rack and pinion drive system to raise and lower the door. A plurality of hydraulic cylinders are used to seal the door to the tank. The door permits easy placement and removal of pallets from the tank of an electro-erosion machine.

5 Claims, 3 Drawing Sheets

ELECTRO-EROSION MACHINING TANK WITH A SIDE WALL DOOR

The invention relates to an automatic opening system for doors for loading and unloading pallets containing articles, e.g. in electro-erosion machining stations.

In operating stations for machining large components, including at least one machine tool, it is difficult to convey the large components from a carrying station or a place outside the machine tool to the bench thereof or vice versa, since the components are very bulky and/or very heavy and require complicated devices such as cranes or the like which cannot position them accurately.

The problem is particularly acute when machining large components by electro-erosion, using at least one machine tool, since the benches of machine tools of this kind include a tray or vessel such that at present the large components have to be positioned from above, necessitating the use of cranes.

The invention provides a novel automatic opening system for doors for loading and unloading pallets containing components, e.g. in electro-erosion machining centres, in which the vessel or tank, i.e. the machine-tool bench, has at least one side wall in the form of a door, with means for guided linear opening and closing motion thereof relative to the rest of the vessel and means for hermetic locking thereof in the closed position.

More particularly the means for linear guided motion of the door relative to the vessel are:

a) at least one motor disposed in the fixed body and having an output shaft coupled, either directly or via chains, to one or more transmission means such as sets of pinions engaging coupled racks mounted at both sides of the door, which moves either through gravity or through rotation of the motor and b) male and female coupled guides in the door or vessel, determining the direction of motion.

More particularly, the means for hermetically locking the door relative to the vessel, when in the closed position, are a number of hydraulic cylinders disposed in the fixed body and having pistons which press against the door and seal it when they strike against peripheral pressure joints disposed in a facing position in the vessel.

Figure 1:
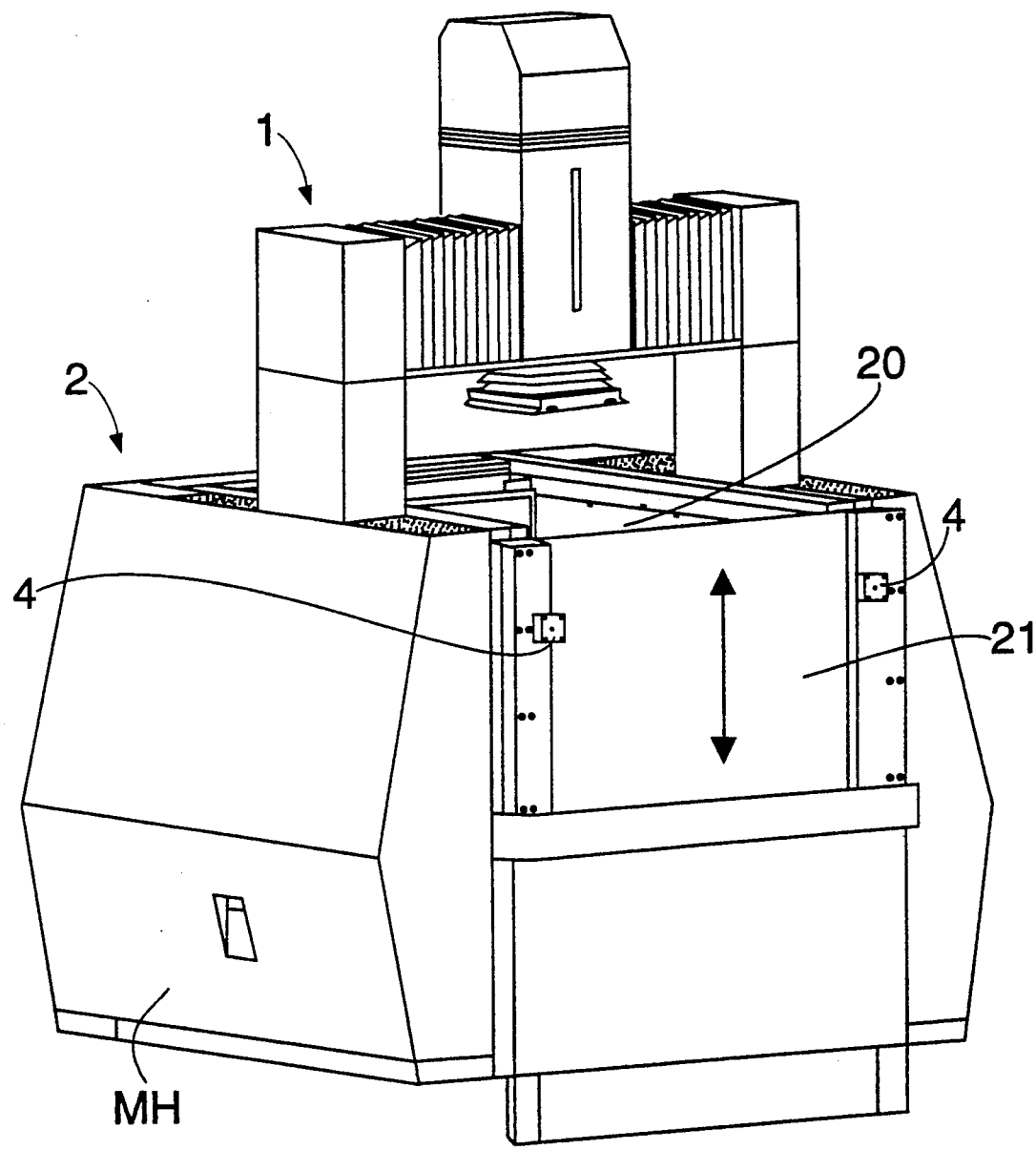
FIG. 1 is a diagrammatic general view in front elevation of a machine tool (Spanish abbreviation MH) fitted with the automatic opening system for doors or gates for loading and unloading pallets holding components, e.g. in electro-erosion machining stations, the system being incorporated in the tank or bench 2.
Figure 2:
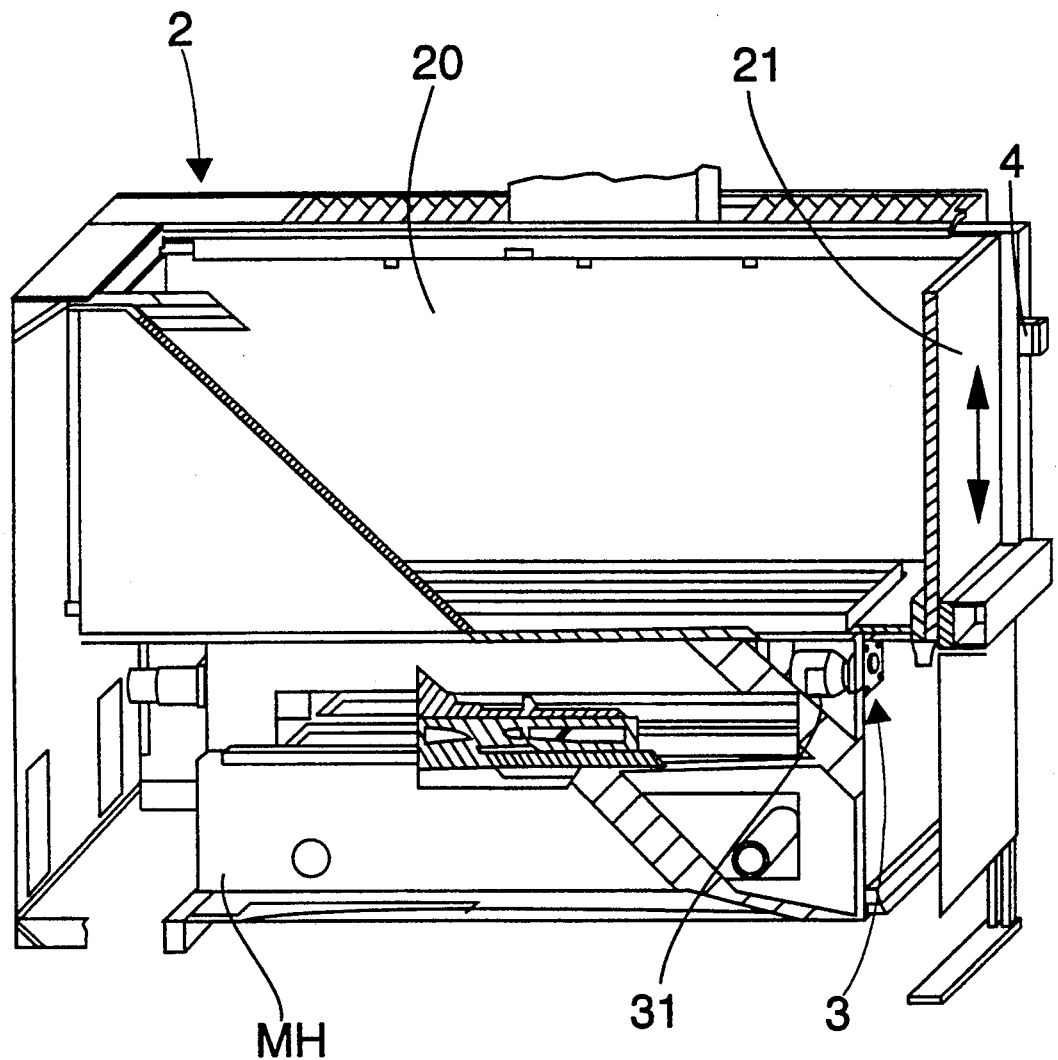
FIG. 2 is a general view in side elevation of the machine tool (MH) shown in the previous Figure but without its head or bridge 1 and partly in section to show its structure and details.
Figure 3:
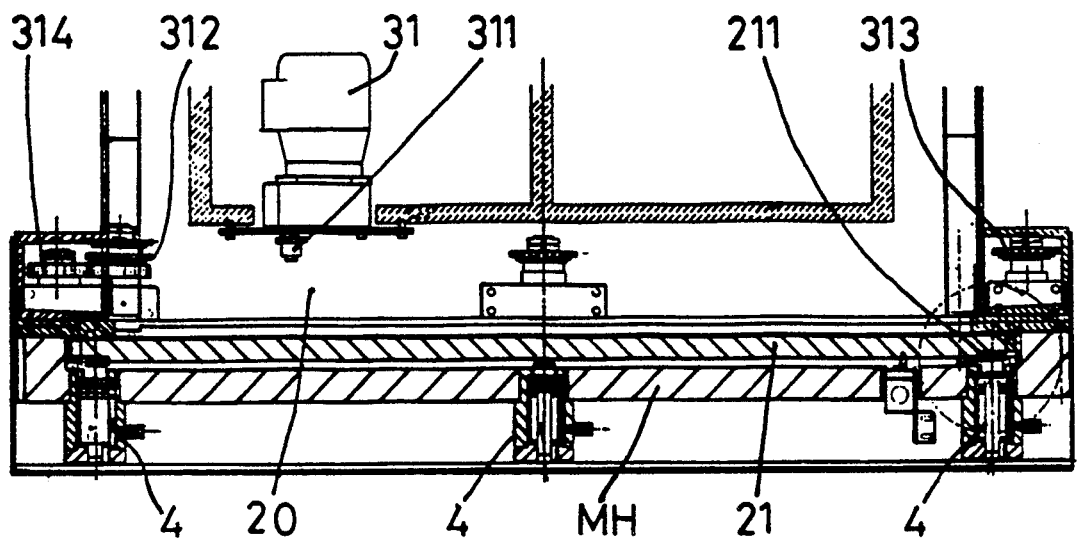
Figure 4:
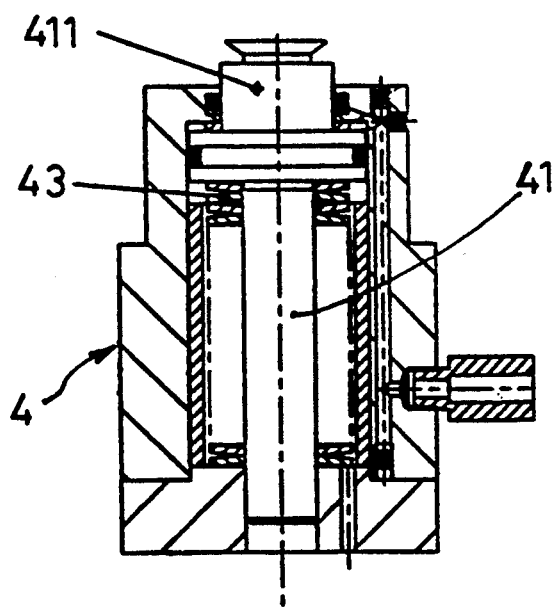

FIG. 3 is a cross-section in plan view of the automatic opening system for doors for loading and unloading pallets holding components, more particularly in electro-erosion machining stations according to the invention, the system being included in the machine tool (MH) shown in FIGS. 1 and 2, and FIG. 4 is a more detailed view in section of a preferred structure of the locking means 4 between the door 21 and the rest of the vessel or bench 2.

The invention relates to an automatic opening system for doors for loading and unloading pallets holding articles, e.g. in electro-erosion machining centres.

Machine tools (MH) of this kind, as shown in the drawings, comprise a tank/bench 2 below an operating head or bridge 1.

According to the invention and as shown in the drawings, the tank or bench 2 has at least one side wall 21 in the form of a door, in that the remaining walls 20 are stationary and are mounted in the stationary body of the machine tool MH.

The door 21, or every existing door 21, comprises:

Means 3 for linear guided movement thereof relative to the rest of the tank or vessel 20, and Means 4 for hermetically locking the door 21 relative to the tank or vessel 20 in the closed position.

The door 21 moves in guided linear manner, up and down or transversely, between two extreme open and closed positions.

According to the invention and as shown in the drawings, the means 3 for guided linear motion of the door 21 relative to the rest of the tank or bench 20 are at least one motor 31 having an output driving shaft coupled to a multiple pinion 311 engaging transmission chains 312 which transmit motion to respective pinions 313, 314 which engage coupled racks 315, 316 provided in the door 21.

According to the invention and as shown in the drawings, the means for hermetically locking the door 21 in the rest of the tank or bench 20 are a number of hydraulic cylinders 4 disposed in the fixed body of the machine tool MH, and each having a piston 41 comprising a pressure head 411 which abuts against the door 21 and seals it against the tank or bench 20 in co-operation with closing joints 42 which seal the joint.

The closing and opening positions are determined by the actuating fluid (hydraulic actuation) in co-operation, in the present case, with some pressure washers 43 (see FIG. 4) included in suitable numbers and arrangement to produce a given preliminary load.

In a non-limitative preferred embodiment, the guided linear motion of the door 21 relative to the fixed body and the tank or bench 20 is brought about, as shown in FIG. 3, by forming a dovetail or similar guide 211 in the door 21, so as to receive the head 411 of the piston 41, which is therefore given a matching shape.

I claim:

1. In an electro-erosion machine, a tank having a side wall, an opening in the side wall of the tank, a door which is vertically movable between upper and lower positions, said door in said upper position sealing the said opening in the side wall of the tank, said door in said lower position permitting access to the interior of said tank through said opening in the side wall of the tank, a pair of guide means, each of said guide means being mounted on said tank adjacent to the opposed sides of the said door, said guide means guiding the said door between its upper and lower positions, sealing means mounted on said guide means for hermetically sealing said door when said door is in its upper position, two transmission means, one transmission means positioned on one side of the said door and the other transmission means positioned on the other side of the said door, said transmission means effecting movement of said door at least between the lower position of the door and the upper position of the door, a motor mounted in said electro-erosion machine, said motor having a rotatable output shaft mechanically coupled to each of said two transmission means operative on each side of said door, rotation of said output shaft causing simultaneous and identical operation of said two transmission means.

2. The electro-erosion machine of claim 1 wherein the said sealing mean comprises a plurality of hydraulic cylinders mounted on said guide means.

3. The electro-erosion machine of claim 1 wherein the said transmission means comprises pinions which engage racks mounted on each side of the said door.

4. The electro-erosion machine of claim 1 wherein said transmission means effects movement of said door from both the upper position to the lower position and the lower position to the upper position.

5. In an electro-erosion machine, a tank having a side wall, an opening in the side wall of the tank, a door which is vertically movable between upper and lower positions, said door in said upper position sealing the said opening in the side wall of the tank, said door in said lower position permitting access to the interior of said tank through said opening in the side wall of the tank, a pair of guide means, each of said guide means being mounted on said tank adjacent to the opposed sides of the said door, said guide means guiding the said door between its upper and lower positions, sealing means mounted on said guide means for hermetically sealing said door when said door is in its upper position, said sealing means comprising a plurality of hydraulic cylinders mounted on said guide means, at least one motor mounted in said electro-erosion machine, said motor having a rotatable output shaft mechanically coupled to two transmission means, one on each side of said door, said transmission means comprising pinions which engage racks mounted on each side of the said door, rotation of said output shaft causing simultaneous and identical operation of said two transmission means.

* * * * *